United States Patent [19]

Kekish et al.

[11] 4,312,901

[45] Jan. 26, 1982

[54] OIL BASED SIDE RELEASE AGENTS FOR COAL CARS

[75] Inventors: George T. Kekish, Chicago; Roger W. Kugel, Warrenville, both of Ill.

[73] Assignee: Nalco Chemical Company, Oak Brook, Ill.

[21] Appl. No.: 144,119

[22] Filed: Apr. 28, 1980

[51] Int. Cl.[3] ........................ B05D 1/02; B05D 7/22; B05D 5/08; B60S 5/00

[52] U.S. Cl. .................................... 427/236; 427/239; 428/457; 252/51.5 A; 252/52 R; 252/70; 106/13

[58] Field of Search ................................ 427/236, 239

[56] References Cited

U.S. PATENT DOCUMENTS 3,007,811 11/1961 Collings .............................. 427/239
3,298,804 1/1967 Schoch .................................... 44/6
3,794,472 2/1974 Macaluso et al. ........................ 44/6
4,117,214 9/1978 Parks et al. ......................... 427/220

FOREIGN PATENT DOCUMENTS 2830407 1/1979 Fed. Rep. of Germany ...... 427/236

*Primary Examiner*—James R. Hoffman
*Attorney, Agent, or Firm*—John G. Premo; Robert A. Miller

[57] ABSTRACT

A method for reducing the tendency of coal to freeze and thus adhere to the sides of metal storage and shipping containers used to store and/or transport said coal at temperatures below the freezing point of water which comprises applying to the sides of the container a coating composition comprising:

a. 55–97% by weight of a hydrocarbon liquid;
b. 3–45% by weight of a hydrocarbon oil-soluble surfactant having an HLB value of 1–8.

4 Claims, No Drawings

OIL BASED SIDE RELEASE AGENTS FOR COAL CARS

Mineral products including coal, iron ore, clays, crude uranium ores, and other both crude and refined materials oftentimes are transported considerable distances in open top transport vehicles. While presenting no problem during the summer months in temperate climates, during the winter months when temperatures tend to fall to well below freezing temperatures serious problems develop in transporting materials of the type described above in that the particles will freeze together and thus make it difficult to unload the transport container. Furthermore, due to the fact that the container's walls form natural channels for the drainage of water caused by snow, rain, etc., build-ups of ice on the car sides often occur also preventing sufficient removal of the transported material from the container.

While in recent years effective treatments to prevent freezing together of the particles themselves have been developed, the problem caused by freezing of the mineral material along the car side has been neglected. This has resulted in severe loss of material due to the impossibility of unloading it from the car container, and oftentimes excess fuel costs and labor charges when breaking apart or defrosting the materials from the container sides.

It is, therefore, an object of this invention to provide to the art a material which when sprayed onto the sides of containers useful for transporting mineral materials during winter months will prevent the mineral material from adhering to the side of the container.

A further object of this invention is to provide an easily sprayable hydrophobic composition which can be coated onto the sides of containers used for the transport of mineral materials in winter months which will prevent freezing for the mineral materials to the containers sides when the container is to be transported below freezing temperature conditions.

Other objects will appear hereinafter.

THE INVENTION

As stated above, the instant invention is directed to a composition and method for preventing the adherence of minerals to the sides of containers used to transport these minerals during freezing conditions.

THE COMPOSITION

The composition of this invention is composed of two ingredients. The first, is a hydrocarbon oil. This hydrocarbon oil may be selected from a wide range of materials. Paraffin oils, fuel oils, vegetable oils, etc., will all function as this component of our composition. Due to cost considerations and the need that the final composition of this invention be fluid, a preferred hydrocarbon oil for use in this invention is No. 2 fuel oil. The No. 2 fuel oil will form from 50–90% by weight of the composition of this invention and preferably from 70–90% by weight of the composition of this invention.

The second component of the composition of the instant invention comprises an oil soluble surfactant. These materials may be cationic, anionic, or nonionic. They will be typically low HLB type materials ranging from 1–10, and preferably 1–8. In order to perform satisfactorily they must be soluble in the hydrocarbon oil component of this invention. Suitable surfactants which have been tested and found to perform adequately in this invention include:

| SURFACTANTS | |
|---|---|
| Monamid 340A | (Alkanolamide type) |
| Igepal CA-420 | (Octylphenoxypoly (ethyleneoxy) ethanol) |
| Triton X35 | (Octylphenoxy polyethoxy ethanol) |
| Emphos D70-30C | (Phosphated mono- and diglycerides) |
| Igepal CO210 | (Nonylphenoxypoly (ethyleneoxy) ethanol) |
| Monamid ADY 150 | (Mixed fatty acid alkanolamide) |
| Surfonic N40 | (Alkylaryl polyethylene glycol ether) |
| Igepal CO430 | (Nonylphenoxypoly (ethyleneoxy) ethanol) |
| Monamid IS | (alkanolamide type) |
| Dow Corning 200 | (Silicone type) |
| Oleic Acid | — |
| Lecithin | — |

OTHER MATERIALS

The surfactant components of the instant invention will range from 5–50% by weight of the instant composition and preferably from 10–30% by weight of the instant composition.

Ideally and a preferred embodiment of this invention the surfactant is dissolved at a level of approximately 15% by weight in the hydrocarbon oil. As pointed out before, the surfactant which is chosen must be completely soluble in the hydrocarbon oil selected at the percentages employed.

The composition of the instant invention is made simply by blending the two miscible ingredients together and utilizing stirring to obtain homogeneity of the resulting solution.

THE PROCESS

In the process of the instant invention the compositions described above are sprayed onto the insides of railcars, trucks, or storage bins, and other containers prior to their loading with the mineral material. The amount of composition employed should be sufficient to lightly coat the metallic side of these containers impart a lubricity characteristic as well as make the sides of these containers hydrophobic.

The composition of the instant invention may be sprayed using conventional spraying equipment on to containers intended for the below freezing transport or storage of iron ore, uranium ore, and especially coal. This invention may or may not be used in conjunction with materials such as those described in U.S. Pat. Nos. 4,117,214, 3,298,804 and 3,794,472, which may be sprayed onto the mineral particles themselves to prevent their freezing together. It is pointed out that the material of the instant invention must be sprayed upon the container intended for below freezing temperature transportation or storage of the additives prior to loading.

EXAMPLE 1

Test Procedure

Small steel coal hoppers were sprayed with the additive of interest until the inside was completely weighted. The hoppers were then filled with approximately 1700 grams of $-\frac{1}{2}$" Illinois coal and shuffled to level the coal. The filled hoppers were then placed in a freezer set at −15° C. for one hour. After this period of time the hoppers were removed from the freezer and turned over. The amount of coal remaining in each hopper was scraped out and weighed.

| Additive | Weight of Coal Left in Hopper |
|---|---|
| Blank | 109 grams |
| Water | 199.3 grams |
| Additive prepared using 15% Emphos D70-30C in #2 Fuel Oil | 7.0 grams |
| No. 2 Fuel | 148.3 grams |

EXAMPLE 2

Fifteen percent by weight solutions of the surfactants listed in Table 1 were prepared in the particular hydrocarbon solvent specified. These materials were then coated on steel plates. Water was then sprayed on the coated surface and the characteristics of the surface were observed as to their resulting hydrophobic characteristics. Results are listed in Table 1 below.

TABLE I

| | SURFACTANT TRADENAME-DESCRIPTION | | RESULTS |
|---|---|---|---|
| | Monamid 340A | (alkanolamide type) | Big droplets merge |
| | Igepal CA-420 | (octylphenoxypoly (ethyleneoxy) ethanol) | Good droplet formation |
| (1) | Igepal DM530 | (dialkylphenoxypoly-(ethyleneoxy) ethanol) | Droplet formation poor |
| (2) | Igepal DM530 | (dialkylphenoxypoly-(ethyleneoxy) ethanol) | Droplet formation poor |
| | Igepal DM710 | (dialkylphenoxypoly-(ethyleneoxy) ethanol) | Droplet formation poor |
| | Triton X35 | (octylphenoxy polyethoxy ethanol) | Large droplets |
| | Plurafac A-24 | (oxyethylated straight-chain alcohol) | Droplet formation poor |
| | Igepal CO-520 | (nonylphenoxypoly-(ethyleneoxy) ethanol) | Droplet formation poor |
| (3) | Igepal DM-530 | (dialkylphenoxypoly-ethyleneoxy) ethanol | Droplet formation poor |
| | Igepal CO-210 | (nonylphenoxypoly-ethyleneoxy) ethanol | Small droplet formation |
| | Monamid ADY-150 | (mixed fatty acid alkanol-amide) | Fair droplet formation |
| | Surfonic N-40 | (alkylaryl) | Fair droplet formation |
| | Ninol 2012 Extra | (a fatty acid alkanolamide) | Droplet formation poor |
| | Igepal CO-610 | (nonylphenoxypoly-ethyleneoxy) ethanol | Droplet formation poor |
| (4) | #2 Fuel | | Droplet formation |
| | Igepal CO-430 | (nonylphenoxypoly-(ethyleneoxy) ethanol) | Good droplet formation |
| | Monamid IS | (iso stearate alkanolamide) | Good droplet formation |
| | Emphos CS-1332 | (organic phosphate ester) | Droplet formation poor |
| | Emphos D70-30 | (phosphated mono- and diglycerides) | Droplet formation poor |
| | Emphos CS-1361 | (organic phosphate esters) | Droplet formation poor |
| | Tergitol 15-S-9 | (polyethylene glycol ether of secondary alcohol) | Droplet formation poor |
| (5) | Igepal DM-530 | (dialkylphenoxypoly-ethyleneoxy) ethanol | Droplet formation poor |
| | Oleic Acid | | Good Droplet formation |
| | Monazoline O | (substituted imidazoline of oleic acid) | Poor droplet formation |
| | Monamulse CI | (modified imidazoline) | Poor droplet formation |
| | Dow Corning 200 | (silicone) | Good droplet formation (doesn't spread well) |

All surfactants were tested as 15% by weight solutions in #2 fuel oil, except as noted.
(1) 10% hexylene glycol 224 added
(2) 15% hexylene glycol 224 added
(3) 10% surfactant in #2 fuel
(4) Neat
(5) 15% in Dowanol EPh The materials of the instant invention as described above tend to release the mineral from the sides of the containers much more readily than non-treated containers. As such, treatment of containers with the instant composition and of the instant process provides a means by which to more satisfactorily unload containers of minerals during freezing weather, saving both energy and labor costs ordinarily associated with the thaw of minerals in these types of containers

Having thus described our invention, we claim:

1. A method for reducing the tendency of coal to freeze and thus adhere to the sides of metal storage and shipping containers used to store and/or transport said coal at temperatures below the freezing point of water which comprises spraying on the sides of the interior container a coating composition comprising:

a. 55–97% by weight of a fuel oil;

b. 3–45% by weight of a hydrocarbon oil-soluble surfactant having an HLB value of 1–8.

2. The method of claim 1 wherein the composition comprises:

a. 70–90% by weight of a fuel oil;

b. 10–30% by weight of a hydrocarbon oil-soluble surfactant having an HLB value of 1–8.

3. A method for rendering the sides of metal shipping containers hydrophobic which comprises spraying onto the interior sides of said metal shipping containers a solution comprising:

a. 55–97% by weight of a fuel oil;

b. 3–45% by weight of a hydrocarbon oil-soluble surfactant having an HLB value of 1–8.

4. A method for preventing the adherence of ice to the interior sides of metal storage containers which comprises spraying the interior sides of said metal containers with a composition comprising:

a. 55–97% by weight of a fuel oil;

b. 3–45% by weight of a hydrocarbon oil-soluble surfactant having an HLB value of 1–8.

* * * * *